United States Patent [19]

Shishido et al.

[11] Patent Number: 4,556,787

[45] Date of Patent: Dec. 3, 1985

[54] PHOTOSENSOR FOR OPTICAL OBSERVING OR PHOTOGRAPHING DEVICES

[75] Inventors: Yoshio Shishido, Sagamihara; Shinichi Nishigaki, Tokyo; Shinichi Kato, Hachioji; Kazumasa Matsuo, Tama; Atsushi Miyazaki; Susumu Takahashi, both of Hachioji; Takeaki Nakamura, Hino; Akibumi Ishikawa, Hachioji, all of Japan

[73] Assignee: Olympus Optical Co., Ltd., Tokyo, Japan

[21] Appl. No.: 475,292

[22] Filed: Mar. 14, 1983

[30] Foreign Application Priority Data

Mar. 23, 1982 [JP] Japan .................................. 57-46084
Mar. 23, 1982 [JP] Japan .................................. 57-46085

[51] Int. Cl.$^4$ .......................................... G01J 1/20
[52] U.S. Cl. ................................. 250/201; 354/404; 354/403
[58] Field of Search ................ 250/201, 204; 354/404, 354/405, 403, 400; 356/1, 4

[56] References Cited

U.S. PATENT DOCUMENTS 3,969,575  7/1976  Gerritsen ............................ 250/201
4,152,586  5/1979  Elliott ................................. 250/204
4,357,104 11/1982  Davinson ........................... 250/201

Primary Examiner—David C. Nelms
Assistant Examiner—J. Jon Brophy
Attorney, Agent, or Firm—Kenyon & Kenyon

[57] ABSTRACT

The photosensor is provided with a light-receiving surface for receiving a reflected image of an object and in which an aperture is provided. The aperture is positioned so as to receive a focused image and means are provided to prevent light from leaking directly to the light-receiving surface from the aperture. Prevention of light leakage permits focusing to be detected at high precision.

5 Claims, 7 Drawing Figures

PHOTOSENSOR FOR OPTICAL OBSERVING OR PHOTOGRAPHING DEVICES

This invention relates to a photosensor. More particularly, this invention relates to a photosensor for optical observing or photographing devices such as endoscopes, cameras and television cameras.

BACKGROUND OF THE INVENTION

Generally, it has been known to provide optical observing devices and optical photographing devices such as endoscopes, cameras and television cameras with detecting means to determine when the device is in focus. Specifically, these detecting means have been provided to determine whether the image-forming position of the image-forming or photographing optical system of the device is in a focused state in which an image is clearly formed on an image-forming surface, such as a film surface for the object being observed.

In the past, it has been difficult to detect at a high precision with a simple structure whether a focused state is obtained in which the optical image of an object is clearly formed on the image-forming surface for photographing or observation.

For example, in a conventional focusing detecting device, should the object to be photographed be dark or use made of a dark photographing optical system, the detecting output of a light-receiving element receiving the image becomes so small that detection of the focused state is substantially impossible. To overcome such problems, it has been known to project a beam of a fixed shape toward the object to be photographed in a manner as described in the laid open Japanese Patent Application No. 19810/1974. In this case, use is made of an optical system in which the projecting means is independent of the photographing lens system. However, such a construction can hardly be used in an endoscope or the like in which photographing must be made in a single light path.

It has also been known to use split prisms, such as described in the laid open Japanese Patent Application No. 128923/1981. However, in case a precision above a fixed level is required, then a light-receiving element will be required. Further, the circuit system for detecting whether focusing is achieved or not by comparing output signals from the light-receiving elements will be complicated. Still further, for a small number of products, the cost will be high.

It has also been known to construct a focusing detecting device wherein a light source is flickered in order to project lights onto an object to be photographed. In this case, the output signals in the extinguished sections are deducted from the output signals in the lighted sections in order to reduce the influence of external lights other than of the light source. In this way, focusing may be detected even in case the object to be photographed is dark or if a dark photographing optical system is used. Such a system which employs a flickering light source is described in laid open Japanese Application No. 125713/1981. However, in this construction, this system requires two positions conjugate with a predetermined image-forming surface (e.g., a film surface) on both sides of the image-forming surface. Thus, the light projected onto an object by a light-projecting means arranged in one position may be received by the light-receiving means arranged in the other position. As a result, there have been problems in that comparatively large spaces are required for the light-projecting means and the light-receiving means. Further, the fabrication of the focusing, detecting optical system and the circuit system are complicated. As a result, the cost of such a system is high.

Accordingly, it is an object of the invention to provide a photosensor of relatively simple construction.

It is another object of the invention to provide a photosensor wherein a signal-to-noise ratio can be made large and focusing can be detected with a high precision.

It is another object of the invention to provide a photosensor which is able to detect focusing in a simple manner.

It is another object of the invention to provide a photosensor which can be made at relatively low cost.

BRIEF SUMMARY OF THE INVENTION

Briefly, the invention provides a photosensor having a light-emitting means for passing a light along an optical axis to an object, a light-receiving surface having a photoelectric converting function and an aperture on the optical axis for receiving a focused image of the object and a light-intercepting means for preventing the light from the light-emitting means from leaking directly to the light-receiving surface.

In one embodiment, for example where the light-receiving surface is formed by a PN junction surface of a semi-conductor unit, the light-intercepting means may be in the form of a film which is formed on a side wall of the aperture passing through the light-receiving surface. In this case, the light-emitting means may be in the form, for example of a light-emitting diode, which is disposed within the aperture or which projects slightly out of the planes of the surface of the light-receiving surface. Alternatively, the light-emitting means may be positioned behind the aperture in the light-receiving surface. In this case also, the back side of the light-emitting surface may be provided with a light-intercepting film.

In another embodiment, the light-intercepting means may be in the form of a pipe which is fitted within the aperture of the light-receiving surface.

In still another embodiment, the light-intercepting means may be in the form of a transparent member which is fitted within the aperture and which has a clad layer with a refractive index lower than the refractive index of the transparent member.

In still another embodiment, the light-intercepting means may include a plate on a side of the light-receiving surface with an opening on the optical axis which is smaller than the aperture in the light-receiving surface. In this embodiment, with a light-emitting means located behind the plate, the opening in the plate may be used to control the angle of light which passes through to the aperture in the light-receiving means.

In still another embodiment, with the light-emitting means disposed in the aperture of the light-receiving means, the light intercepting means may be in the form of a covering on the periphery of the light-emitting means.

In any of these embodiments, the photosensor is utilized with a focusing lens which is disposed on the optical axis. Thus, when the lens is in a focusing state, a light emitted by the light-emitting means is reflected back from an object to a focused point within the aperture of the light-receiving surface. Thus, a signal can be emitted to indicate a focused state. In the event that the lens is not in a focused position, the image which is reflected, is imposed, in part, on the light-receiving surface about the aperture. As a result, a signal indicating a non-focused state can be emitted.

These and other objects and advantages of the invention will become more apparent from the following detailed description taken in conjunction with the accompanying drawings wherein FIG. 1 illustrates a side cross-sectional view of a system employing a photosensor constructed in accordance with the invention;

FIG. 2 graphically illustrates a characteristic diagram of the output characteristics of the photosensor of FIG. 1;

Figure 1:
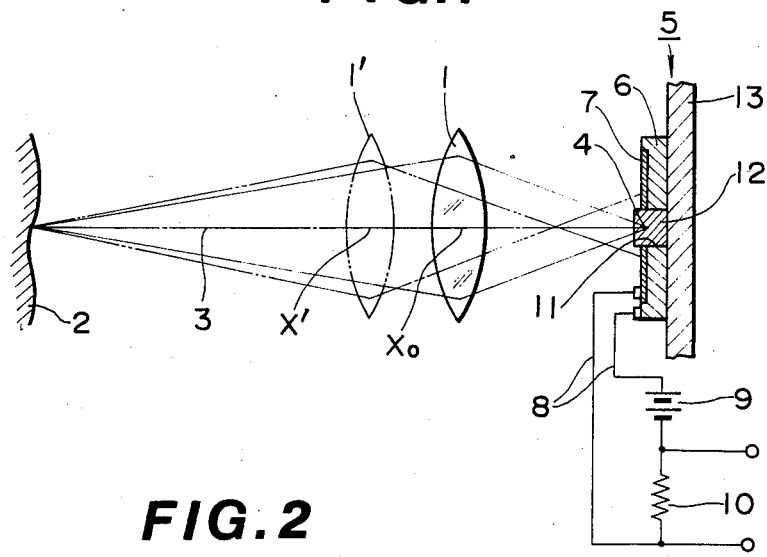

Referring to FIG. 1, the focusing detecting system includes a photographing or image-forming lens 1 which is located on an optical axis 3 so as to form an image of an object 2 to be photographed on a predetermined image-forming surface, such as a film surface. In addition, the system has a photosensor 5 arranged in a position 4 on the optical axis 3 which is conjugate with the predetermined image-forming surface.

As shown, the photosensor 5 has a light-receiving surface facing the lens 1 which has a photoelectric converting function This surface may be formed by a thin P-type semiconductor layer 7 which is formed on a plate-shaped N-type semiconductor 6. As indicated, a series circuit of a battery 9 and resistance 10 is connected through lead wires 8 to the PN junction surface. The side of the P-type semi-conductor layer 7 is biased in the reverse direction by the battery 9 so as to be negative. Thus, when a light is incident upon the PN junction surface, a photoelectric current will flow through the PN junction surface in response to the amount of light. Thus, whether a focused state or not occurs can be detected by measuring the voltage between both ends of the resistance 10 (or by measuring the current flowing through the resistance 10).

As shown, the light-receiving surface 6, 7 has an aperture 11 therein on the optical axis 3 for receiving a focused image of the object 2 from the lens 1. In addition, a light-emitting means 12, such as a light-emitting diode (LED) is positioned within the aperture 11 for passing a light along the optical axis 3 through the lens 1 to the object 2. The front end (i.e., the light-emitting bright point part, of the light-emitting means 12)is so formed as to be flush with or project out of the plane of the P-type semi-conductor layer 7. In addition, a light-intercepting means is formed on a side part of the light-emitting means 12 so that light emitted from the means 12 may not lead directly to the light-receiving surface 6, 7.

As illustrated, the semi-conductor plate 6 is fitted on a back surface to a base plate 13 via a bonding agent or the like. This base plate 13 also serves to intercept light before the light can reach the plate 6. If the semi-conductor layer 6 is made thick, the base plate 13 can be replaced by a coating or a painted film formed of a light-intercepting substance.

In order to detect focusing, electric power is fed via lead wires or the like (not shown) to the light-emitting member 12. A beam of light is then emitted by the light-emitting means 12 onto the object 2 via the lens. A part of the projected light will then be reflected by the object 2 and will return to the photosensor 5 via the lens 1. In this case, if the lens 1 is in a focused state or focused position $X_o$ for the object 2, the projected light will illuminate a spot on the object 2 on the optical axis 3. In addition, the reflected light at the position 4 conjugate with the image-forming surface will also form a spot (as indicated by the fine solid lines) within the aperture 11. Thus, light will not reach the light-receiving surface formed by the PN junction. As a result, current will not substantially flow between the semiconductor layer 7 and the semi-conductor plate 6 of the photosensor 5. The current will thus be only of a dark current component and the voltage $V_o$ at the output ends of both ends of the resistance 10 will be substantially zero as shown in FIG. 2.

On the other hand, in case the lens is in the position $X'$ corresponding to a rear focusing state in which the lens 1 is displaced forward from the focused position $X_o$, the reflected light from the object 2 will expand over the light-receiving surface of the photosensor 5. Thus, a photoelectric current corresponding to the amount of light incident upon the light-receiving surface will flow between the P-type semi-conductor layer 7 and the N-type semi-conductor plate 6 of the photosensor. This output voltage $V'$, as shown in FIG. 2, will be far larger than in the case of the voltage at the focused position $X_o$.

In the case of a front focusing in which the lens 1 is displaced rearward from the focused position, the light-collecting point will be located at a position rearward from the light-receiving surface. In this case, light will reach the light-receiving surface and a photoelectric current corresponding to the amount of light incident thereon will flow.

Figure 2:
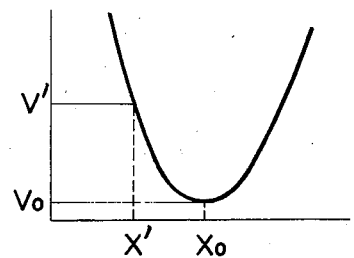

Referring to FIG. 2, when the lens is in a focused position $X_o$, the output voltage $V_o$ will be at a minimum photoelectric current value (called a dark current) between the output ends of the photosensor 5. In a state displaced from this focused position, a current larger than the dark current value and corresponding to the light amount illuminating the light-receiving surface will flow. Even in a state displaced slightly forward or rearward from the focused position $X_o$, an output voltage far larger than the output voltage $V_o$ will be emitted at both ends of the resistance 10.

Thus, as the front ends of a single or plural bright points of the light-emitting means 12 are either flush with or project forward of the light-receiving surface and as the light-emitting means 12 is covered with a light-intercepting means, leakage of light far from the light-emitting means 12 onto the light-receiving surface can be eliminated. Thus, the signal-to-noise ratio can be kept large. As a result, focusing can be detected at a high precision.

As a note, if the light-emitting means 12 is covered on the periphery with a light-intercepting means, the bright point need not be so arranged as to project forward of the light-receiving surface.

Figure 3:
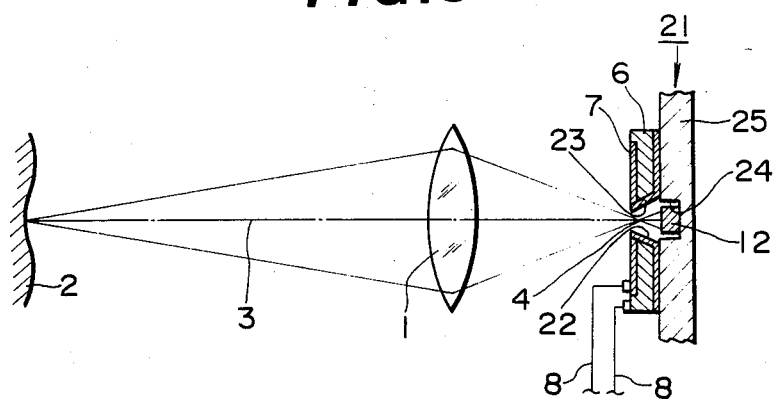
FIG. 3 illustrates a cross-sectional view similar to FIG. 1 of a modified photosensor in accordance with the invention.

Referring to FIG. 3 wherein like reference characters indicate like parts above, the photosensor 21 may be constructed so that the aperture 22 in the light-receiving surface 6, 7 expands within the N-type semi-conductor plate 6. In this case, the aperture 22 can be formed by an etching treatment with the back side of the semi-conductor plate 6 being an etched surface. In this case, the light-intercepting means may be in the form of an insulating film which is coated or painted on the peripheral surface of the aperture 22 in order to prevent the PN junction surface from being short-circuited. Alternatively, the semi-conductor layer 7 may be formed within the semi-conductor plate 6 such that only the plate 6 forms the aperture 22. In this case, a light-intercepting film 23 may be formed by evaporatively depositing a metal on the peripheral surface of the aperture 22 and the back surface of the semi-conductor plate 6.

As shown in FIG. 3, the semi-conductor plate 6 is provided on the back surface with a light-intercepting film 23 and is fitted to a light-intercepting base plate 25 via a bonding agent or the like. This base plate 25 has a recess 24 on the optical axis 3 which is located behind and in alignment with the aperture 22 in order to receive a light-emitting diode 12.

The photosensor 21 is characterized in that the light from the light-emitting diode 12 is projected onto the object 2 without having the light leak directly to the light-receiving surface due to the presence of the light-intercepting film 23. Thus, the dark current component will not become large.

The operation of the photosensor 21 is similar to the photosensor 5 described above. Further, in this case, the aperture 22 is formed so as to be smaller in diameter on the front surface side than on the rear end side in order to detect focusing at a high precision. In this case, the precision of this embodiment is higher than in the case of the first embodiment of FIG. 1.

Alternatively, instead of applying the light-intercepting film 23 by deposition of a metal, application may be made by a light-intercepting paint. Further, even in case the semi-conductor layer 7 and the semi-conductor plate 6 are exposed to the side part of the aperture 22, an insulative paint can be directly applied to the layer 7 and plate 6.

Of note, the light-emitting diode 12 may be constructed to project partly into the aperture 22 or through the aperture 22 out of the planes of the light-emitting surface 6, 7.

Further, the apertures 11, 22 of the embodiments of FIGS. 1 and 2 may be circular, square or slit-shaped.

Further, the light-emitting element may use light in a visible range. Alternatively, light outside the visible range may be used. For example, using light in an infrared range may reduce the influence of any external light on the dark current component. In this respect, the light-receiving surfaces of the photosensors 5, 21 should have high photosensitive characteristics to the wavelengths of the light which is used.

Figure 4:
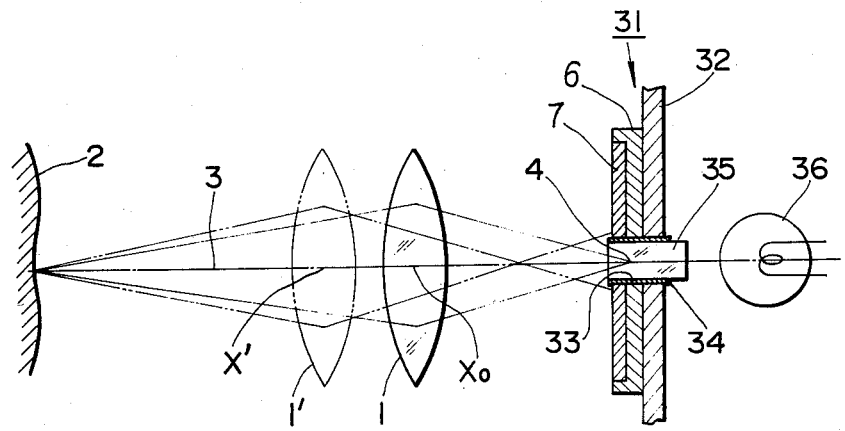
FIG. 4 illustrates a view similar to FIG. 1 of a further modified photosensor employing a transparent member in accordance with the invention.

Referring to FIG. 4, wherein like reference characters indicate like parts as above, the photosensor 31 has a light-receiving surface formed by a P-type semi-conductor layer 7 bonded to a N-type semi-conductor plate 6 so that the plate 6 covers the back surface side and peripheral side of the semi-conductor layer 7. In addition, a light-intercepting base plate 32 which is made of metal or the like is bonded via a bonding agent to the back surface of the plate 6.

A light-intercepting means in the form of a thin pipe 34, for example of no more than 0.1 millimeter thickness, is fitted in an aperture 33 in the PN junction surface and an opening in the base plate 32. A transparent glass bar 35 is also fitted within the pipe 34 in order to prevent the light from leaking from a side of the aperture 33 to the light-receiving surface.

In the event that the P-type semi-conductor layer 7 and the N-type semi-conductor plate 6 are exposed at the edges to the aperture 33, the pipe 34 is formed of an insulative member which will not short-circuit with the PN junction surface or of a conductive member painted or coated on the outer peripheral surface with an insulating member. On the other hand, if only the N-type semi-conductor layer 6 (or the P-type semi-conductor layer 7) is exposed on the side to the aperture 33, a conductive member can be used.

When the photosensor 31 is used to detect focusing, the center axis of the glass bar 35 is positioned on the optical axis 3 and the position of the PN junction surface is arranged to be in the position 4 conjugate with the image-forming surface. In addition, a light source 36 is positioned behind the glass bar 35 to project a light through the glass bar 35 to the object 2.

The operation of the photosensor 31 is the same as described above. In the event that the light-intercepting pipe 34 is fitted to cover the peripheral surface of the aperture 33, no light is leaked to the light-receiving surface 6, 7. Thus, the light from the light source 36 will be prevented from leaking to the PN junction surface before being projected onto the object 2. Thus, the photosensor 31 will be greatly improved than if the pipe 34 is not provided.

In the event that the glass bar 35 or a transparent bar member is not provided, the function of the photosensor 31 will be substantially the same. Also, the P-type semi-conductor layer 7 and the N-type semi-conductor plate 6 may be exchanged for each other. In this case, they are biased in a polarity reverse to the above.

Figure 5:
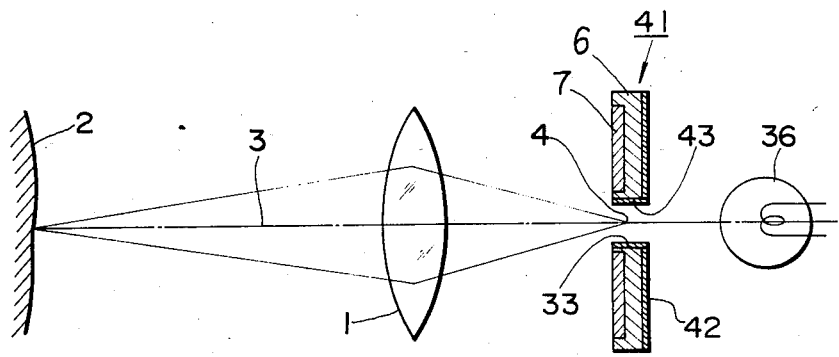
FIG. 5 illustrates a view similar to FIG. 1 of a further modified photosensor in accordance with the invention.

Referring to FIG. 5, wherein like references characters indicate like parts as above, the photosensor 41 may also be constructed such that the N-type semi-conductor plate 6 covers the back surface and the interior peripheral side of the P-type semi-conductor layer 7 and has the aperture 33 formed therein. In this embodiment, the back surface of the N-type semi-conductor plate 6 and the side wall of the aperture 33 are each coated with metal films 42, 43, for example by evaporative deposition of a light-intercepting metal. In this way, the metal films 42, 43 intercept the light from the light source 36 and prevent light from directly reaching the light-receiving surface through the N-type semi-conductor plate 6.

Of note, the surfaces to be coated may be painted with a light-intercepting substance in the same manner as described above.

As shown in FIG. 5, as distinct from the embodiment of FIG. 4, only the N-type semi-conductor layer 6 is exposed to the aperture 33. Otherwise, the operation of this embodiment is the same as the embodiment as described with respect to FIG. 4.

Figure 6:
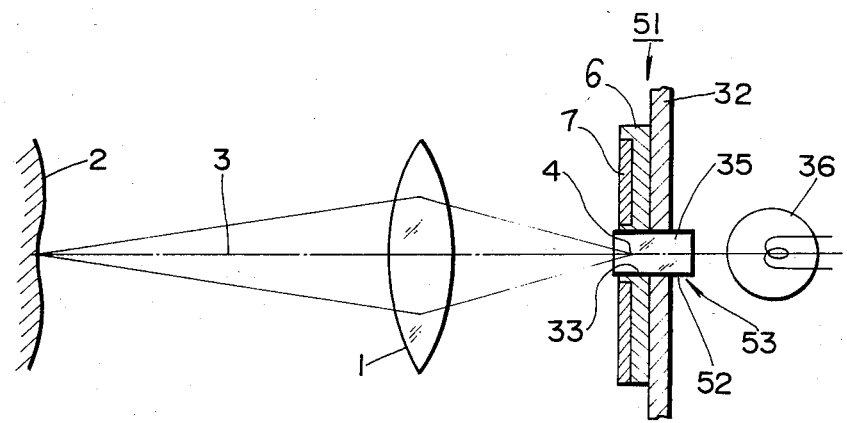
FIG. 6 illustrates a modified photosensor similar to FIG. 4.

Referring to FIG. 6, wherein like reference characters indicate like parts as above, the photosensor 51 may be provided with a glass bar 35 which is coated on the peripheral surface 53 by the evaporative deposition of a metal film 52 instead of using a thin pipe 34 as in the embodiment of FIG. 4. In addition, only the N-type semi-conductor layer 6 is exposed to the aperture 33.

As above, light from a light source 36 is prevented from leaking to the light-receiving surface by the interposed metal film 52.

Alternatively, instead of providing a metal film 52 on the glass bar 35, the glass bar 35 may be formed of a substance high in refractive index while a clad layer is formed on the periphery which is low in refractive index. In this way, a light from a light source 36 will also be prevented from leaking through the side wall of the glass bar 35 to the light-receiving surface.

The function of the photosensor 51 is the same as described above with respect to the embodiment of FIG. 4.

Figure 7:
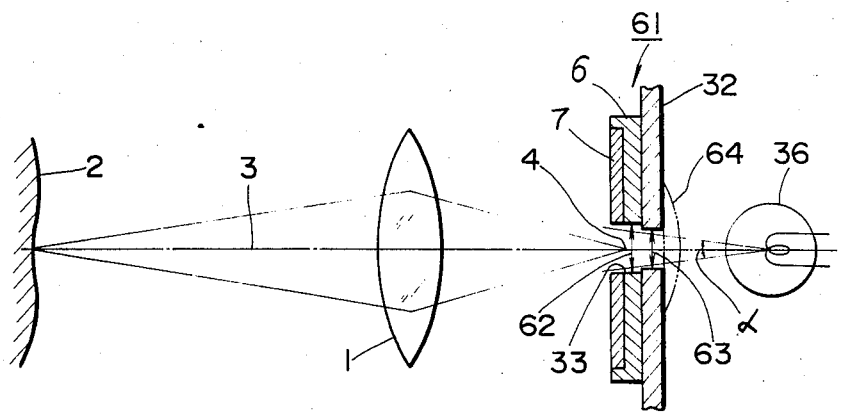
FIG. 7 illustrates a still further modified photo-sensor constructed in accordance with the invention.

Finally, referring to FIG. 7, wherein like reference characters indicate like parts as above, the photosensor 61 may have a light-receiving surface 6, 7 formed with an aperture 33 of a given diameter 62. In addition, the base plate 32 to which the semi-conductor plate 6 is bonded is provided with an opening of a diameter 63 which is smaller than the diameter 62 of the aperture 33. In this way, the range or angle α of the light bundle projected from the light source 36 to the object 2 through the aperture 33 may be regulated. That is, the part of the backing plate 32 which projects inwardly of the aperture 33 can be used to control the range angle α so that light will not leak to the light-receiving surface edges forming the aperture 33.

In addition, if a condensor 164 is arranged on the back surface of the base plate 32 so that a light bundle parallel with the light from the light source 36 is formed, the inward projecting part of the base plate 32 can be reduced.

The operation of the photosensor 61 is the same as the photosensor 31 described above.

Of note, the aperture in the base plate 32 may be of other shape than circular. In this case, the vertical dimension (as shown) is made smaller than the vertical dimension of the aperture 33.

With respect to the embodiments illustrated in FIGS. 4 to 7, the light from the light source 36 is prevented by the pipe 34, metal film 43, metal film 52 and clad layer (not shown) from leaking directly to the light-receiving surface side defining the aperture 33. In case the reflected light is converged by the lens 1 to a position 4 which is conjugate with the image-forming surface expands rearwardly from the position 4, the light is also prevented from leaking to the light-receiving surface from the side wall of the aperture 33.

With respect to the embodiment of FIG. 7, should the leakage of light due to an expansion of the reflected image rearward of the conjugate position 4 be objectionable, a light-intercepting pipe may be fitted on the side wall of the aperture 33. Alternatively, an evaporatively deposited film may be formed thereat or an escape part of enlarged diameter may be formed rearwardly of the aperture 33.

In the various embodiments described above, the shape of the aperture in the light-receiving surface is not limited to a circular shape. Instead, the aperture may be square, may be a small hole, or may be a slit-shaped opening. Further, the aperture may be defined by a permeated window which covers an opening with a transparent member passing the projected light.

Further, the light-emitting means 12 may emit a light in the visible range or the infra-red range. Further, the light may be emitted using an alternating current connection such that the light is emitted in the form of pulses at a specific frequency. If only the frequency component is taken out on the light-receiving side, the influence of external light can be reduced.

The light-receiving surface may be formed of a PN junction surface but may also be made of a phototransistor structure having an amplifying action in addition to the PN junction surface. Alternatively, the light-receiving surface may be made of CdS or CdSe so as to be different in the resistance value depending on the light. Also, the light-receiving means may be a phototransistor of a three-pole structure.

The invention thus provides a photosensor of relatively simple compact structure. Further, the photosensor can be constructed at a relatively low cost.

The invention further provides a photosensor for detecting a focusing state which is of small lightweight construction.

Of note, the photosensor can be contained or fitted within a small space without substantially increasing the weight of an optical instrument. As such, the photosensor can be used with various types of optical observing devices and optical photographing devices. The invention further provides a photosensor which can reliably indicate a focusing state where it is important to clearly form an image on a predetermined image-forming surface. As such, the photosensor is capable of extensive use.

What is claimed is:

1. In combination
   a lens disposed on an optical axis;
   a light receiving surface facing said lens and having a photoelectric converting function, said surface having an operture therein on said optical axis for receiving a focused image of the object from said lens;
   a light emitting means disposed on an opposite side of said surface from said lens for passing a light along said optical axis through said lens to an object; and
   light intercepting means for preventing the light from said light emitting means from leaking directly to said light receiving surface, said light intercepting means including a plate on said opposite side of said light receiving surface with an opening on said optical axis smaller than said aperture in said light receiving surface.

2. In combination
   a lens disposed on an optical axis;
   a light receiving surface facing said lens and having a photoelectric converting function, said surface having an aperture therein on said optical axis for receiving a focused image of the object from said lens;
   a light emitting means disposed in said aperture for passing a light along said optical axis through said lens to an object; and
   a light intercepting covering on the periphery of said light emitting means for preventing the light from said light emitting means from leaking directly to said light receiving surface.

3. A photosensor having
   a light emitting means for passing a light along an optical axis to an object;
   a light receiving surface having a photoelectric converting function, said surface having an aperture on said optical axis for receiving a focused image of the object; and
   light intercepting means for preventing the light from said light emitting means from leaking directly to said light receiving surface, said light intercepting means including a plate on a counter side of said light receiving surface with an opening on said optical axis smaller than said aperture in said light receiving surface.

4. A photosensor having a light receiving surface having a photoelectric converting function, said surface having an aperture on said optical axis for receiving a focused image of the object;

a light emitting means disposed in said aperture for passing a light along an optical axis to an object; and a light intercepting covering on the periphery of said light emitting means for preventing the light from said light emitting means from leaking directly to said light receiving surface.

5. A photosensor for detecting a focusing state of a lens, said photosensor including a light receiving surface having a photoelectric converting function for receiving an unfocused image from the lens, said surface including an aperture on an optical axis for receiving a focused image from the lens;

a light emitting means disposed behind said aperture relative to the lens for passing a light along said optical axis to the lens; and a plate on a side of said light receiving surface between said surface and said light emitting means, said plate having an opening on said optical axis smaller than said aperture for preventing the light from said light emitting means from leaking directly to said light receiving means.

* * * * *